(12) United States Patent
Hamilton

(10) Patent No.: US 6,456,040 B1
(45) Date of Patent: Sep. 24, 2002

(54) MULTIPLE BATTERY CHARGING SYSTEM AND METHOD

(76) Inventor: John C. Hamilton, 31 Orton Ave., Binghamton, NY (US) 13905

( * ) Notice: Subject to any disclaimer, the term of this patent is extended or adjusted under 35 U.S.C. 154(b) by 0 days.

(21) Appl. No.: 09/928,981

(22) Filed: Aug. 13, 2001

(51) Int. Cl.$^7$ .................................................. H02J 7/00
(52) U.S. Cl. ...................................... 320/116; 320/123
(58) Field of Search ................................ 320/116, 123, 320/126, 128, 127, 130

(56) References Cited

U.S. PATENT DOCUMENTS

| | | | |
|---|---|---|---|
| 4,593,779 A | * | 6/1986 | Kröhling ................... 180/65.4 |
| 6,218,643 B1 | * | 4/2001 | Iwata et al. ................. 219/202 |
| 6,265,847 B1 | * | 7/2001 | Goerke ........................ 320/126 |

* cited by examiner

*Primary Examiner*—Edward H. Tso
*Assistant Examiner*—Lawrence Luk
(74) *Attorney, Agent, or Firm*—Salzman & Levy

(57) ABSTRACT

A system for recharging batteries of an electric vehicle or mobile power plant has a dual or multiple bank of batteries. One of the battery banks powers the vehicle, while the other bank is on stand-by. The system has at least two generators. The generators are engaged to a motor driving one of the wheels of the vehicle, by means of a V-belt and a V-belt drive wheel pulley. The generators are electrically connected to respective banks of the dual or multiple battery banks, and provide transient recharging of the corresponding battery bank when the vehicle or mobile power plant is braking or coasting. Each battery bank is fully discharged before it is recharged, thus extending the battery life.

8 Claims, 2 Drawing Sheets

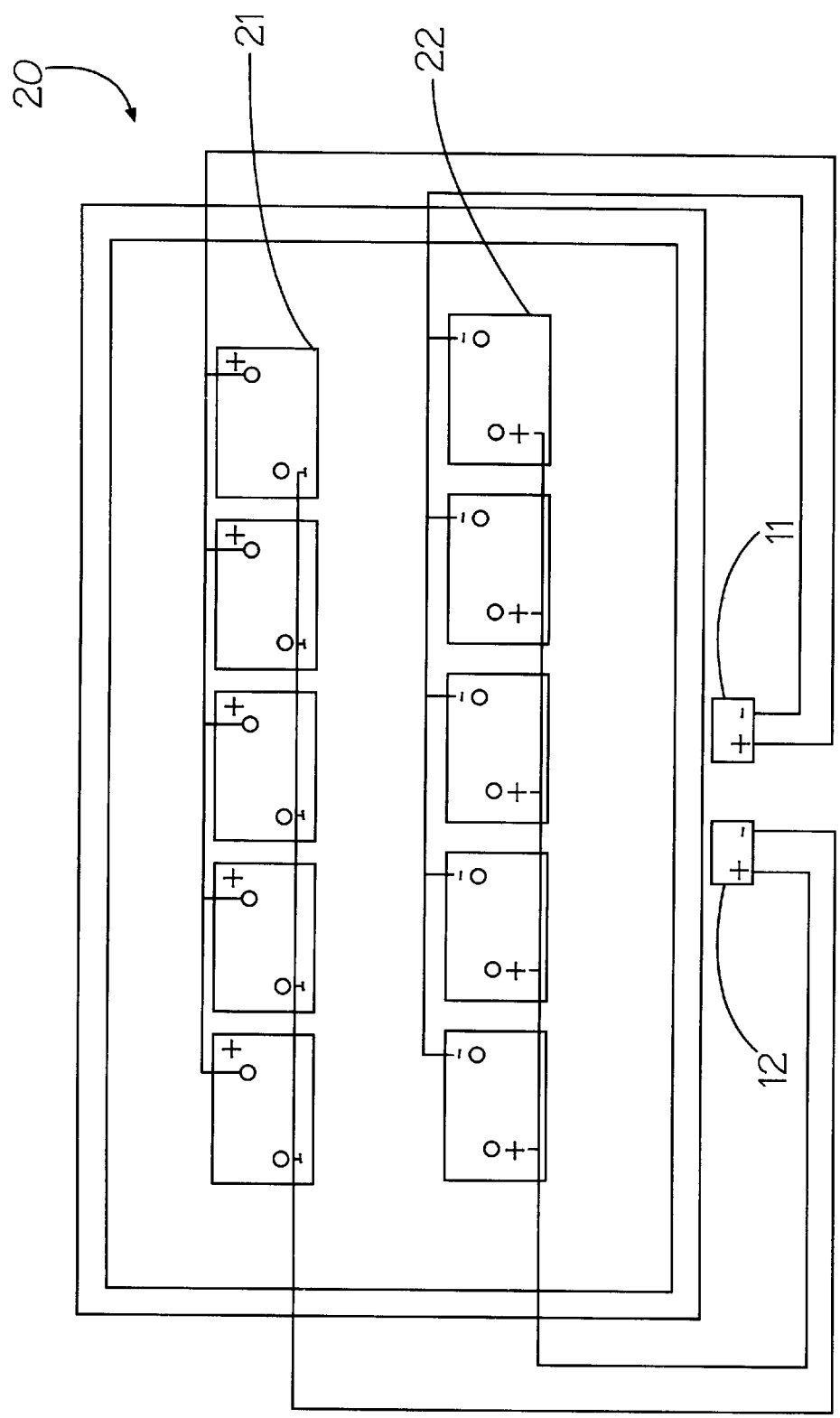

MULTIPLE BATTERY CHARGING SYSTEM AND METHOD

FIELD OF THE INVENTION

The present invention relates to electric battery charging systems and, more particularly, to a dual or multiple battery charging system and method for electrically powered automobiles used daily on a short trip basis and for other electrical devices that require a mobile power plant. The battery charging system eliminates the need for daily recharging of batteries overnight, and extends battery life.

BACKGROUND OF THE INVENTION

Electrically powered automobile systems were introduced at the turn of the last century. The great advantage of electrically powered automobiles is their pollution free, efficient, and quiet running operation. Their re-emergence in the beginnings of the present century as a viable transportation source is the result of dwindling reserves of fossil fuels, environmental and pollution problems, and the desire to provide a more efficient automobile system.

One of the drawbacks in the development of a viable electric car is the need to recharge the batteries after only a relatively short operating period. Even where battery systems provide the ability to traverse hundreds of miles on a single charge, it nonetheless becomes necessary to charge the batteries for an extended length of time, before the vehicle is once more operatively viable. Most present day battery powered automobile systems require recharging overnight. This not only severely limits the range over which the automobile can travel, but it also places an inconvenient limitation on the operation of the car.

Another serious drawback for electric vehicles involves the daily use of such vehicles in order to go a short distance to work, let us say, 100 miles or less, round trip. At the end of the day, the bank of batteries is not fully drained with this type of usage, but the operator is forced to recharge the batteries overnight to have a fully charged system the next day. This is not good for the life of the batteries. Maximum battery life requires that they be fully discharged (i.e., enter a "deep discharge" state) before recharging them. Short-lived batteries require frequent replacement, and large banks of batteries are expensive to replace, when they reach the limit of their operative lives.

The present invention contemplates an electric battery charging system and mobile power plant that will provide a power source, that extends the life of batteries used daily on a short trip basis, and that eliminates the need for daily overnight battery recharging.

The current invention provides at least two generators that can be part of a retrofit kit. The generators mount to the chassis of an electric car or on a standalone mobile platform. A belt drives each generator, and is operatively engaged with the motor driving a wheel of the vehicle or platform. A V-belt drive wheel pulley is attached to the rim of the wheel. Each generator is electrically connected to a respective bank of batteries.

As aforementioned, in order to preserve good battery life, it is essential to allow the batteries to fully discharge before applying a new charge. In a conventional electric vehicle battery system, this requires driving the vehicle or using the mobile power plant until the entire bank of batteries is discharged. Then the batteries must be charged overnight for the next day of operation. In the present inventive system, a first bank of batteries is always charged, while its companion or companions, the second or subsequent battery banks are being discharged. In this manner, an electric car operator can drive a short distance of about 100 miles, or less. Should the first bank of batteries be fully discharged after its daily run, they can be charged overnight. In the event that this first bank of batteries is not fully discharged at the end of the day, they can be used on the following day's run until they fully discharge. In the event that the first bank of batteries is discharged on the second or third day, the second battery bank is switched into the system. At the end of the day, or during relocation of the mobile power plant platform, the fully discharged first battery bank is recharged, while the second battery bank is ready for the next day's run. In this manner, each bank of batteries is always fully discharged, before being recharged, thus extending their operative life. The generators of the system provide for transient recharging of the battery banks, when the car or platform is braking or coasting. The fully charged bank may need a trickle charge, in order to maintain its fully charged status, since charge may dissipate over time with certain battery types.

SUMMARY OF THE INVENTION

In accordance with the present invention, there is provided a system and method for operating an electric vehicle or a mobile power plant in which battery life is extended. In order to preserve good battery life, it is essential to allow the batteries to fully discharge, before applying a new charge. In a conventional electric vehicle battery system, this requires driving the vehicle until the entire bank of batteries is discharged. Then the batteries must be charged overnight for the next day of operation. In the present inventive system, a first bank of batteries is always charged, while its companion or companions, the second or subsequent battery banks are being discharged. In this manner, an operator can drive a short distance of about 100 miles, or less. Should the first bank of batteries be fully discharged after its daily run, it can be charged overnight. In the event that this first bank of batteries is not fully discharged at the end of the day, it can be used on the following day's run until it fully discharges. In the event that the first bank is depleted during the second or third day, the second battery bank is switched into the system. At the end of the day, the fully discharged first battery bank is recharged, while the second battery bank is ready for the next day's run. In this manner, each bank of batteries is always fully discharged, before being recharged, thus extending their operative life.

The system comprises at least two generators. The generators are engaged to the motor driving one of the wheels of the vehicle or platform, by means of a V-belt. The V-belt is operatively connected to a rim of a vehicle or platform, such that it is capable of turning the generator when the vehicle or platform is in motion. The generators are electrically connected to respective banks of batteries, and provide transient recharging of their corresponding battery bank when the car or platform is braking or coasting. The fully charged bank may need a trickle charge, in order to maintain its fully charged status, since charge may dissipate over time with certain battery types.

It is an object of the present invention to provide a battery charging system that extends the natural operative battery life of the system, which may be automotive or a mobile power plant.

It is another object of this invention to provide an electric battery system that will provide for maximum operative life for its batteries.

BRIEF DESCRIPTION OF THE DRAWINGS

A complete understanding of the present invention may be obtained by reference to the accompanying drawings, when considered in conjunction with the subsequent detailed description, in which:

FIG. 2 is a top, schematic view of the generators and dual battery bank of the electrical charging system of the invention.

Figure 1:
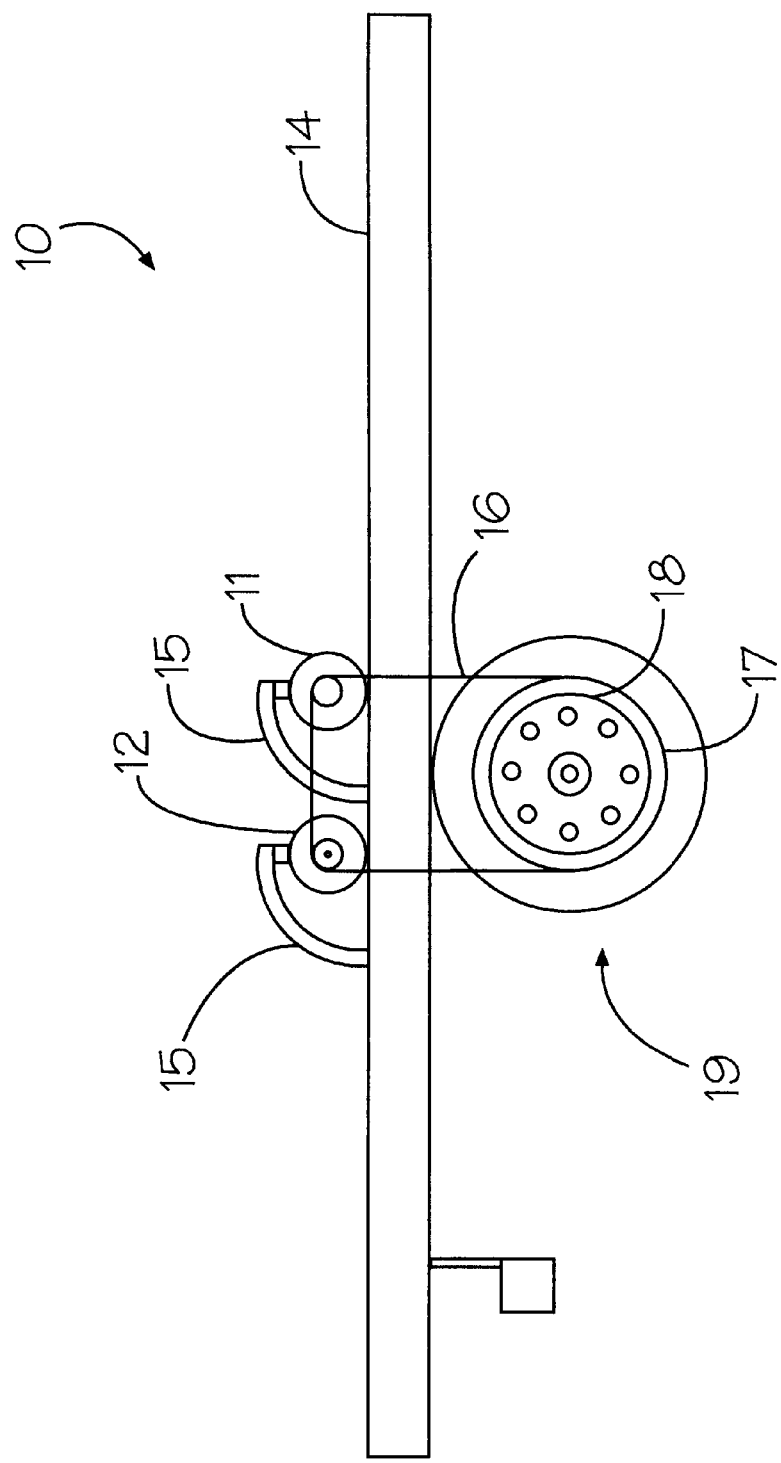
FIG. 1 is a front, schematic view of the recharging system of this invention.

For purposes of brevity and clarity, like components and elements will bear the same designation and numbering throughout the figures.

DESCRIPTION OF THE PREFERRED EMBODIMENT

Generally speaking, this invention is related to systems and methods for recharging batteries used with electric vehicles or as mobile power plants for other electric devices. The system for powering the electric vehicle of this invention comprises a dual or multiple bank of batteries. One of the battery banks powers the vehicle, while the other or subsequent banks are on stand-by. The system comprises at least two generators. The generators are engaged to the motor that drives one of the wheels of the vehicle or platform, by means of a V-belt and a V-belt drive wheel pulley. The generators are electrically connected to respective banks of the battery banks, and provide transient recharging of the corresponding battery bank, when the car or mobile platform is braking or coasting. Each battery bank is fully discharged before it is recharged, thus extending the battery life.

Now referring to FIG. 1, there is shown a transient recharging system 10 for an electric vehicle or power plant. The electrical power system portion 20 is illustrated in FIG. 2. The vehicle or mobile platform 14 is powered by a dual or multiple bank of batteries. For purposes of brevity, only two banks 21 and 22 are shown herein, but it should be understood that more than two banks can be used, depending upon the specific application of the invention. Each bank of batteries 21 and 22 is transient recharged by respective electrical generators 11 and 12 during the braking and/or coasting of the vehicle or mobile platform. While two generation 11, 12 are illustrated for purposes of description, those skilled in the art can readily see how only one generator or multiple generators can also be employed without departing from the scope of the invention.

The electrical generators 11 and 12 are each mounted to a platform 14 by flexible brackets 15. The platform 14 is mountable to a chassis of an automobile or to a platform trailer to be towed by a vehicle. A timing or V-belt 16 wraps around the respective generators 11 and 12, and a V-belt drive wheel pulley 17 operatively connected to a wheel 19 of the vehicle. The motor 18 itself may be electrically powered. As wheel 19 and V-belt drive wheel pulley 17 are caused to turn, belt 16 causes the generators 11 and 12 to recharge their respective battery banks 21 and 22. The battery banks 21 and 22 alternately power four motors 18 (only one shown here), for driving each respective wheel 19 of the vehicle. Monitoring and control of the battery banks 21 and 22 is accomplished through voltage and ampere meters, which tell the system when to switch charging from one battery bank 21 to another battery bank 22. The switch between battery banks 21 and 22 is achieved with the use of high voltage/high ampere manual switches.

In accordance with the present invention, the power system 20 has batteries whose life is extended. In order to preserve good battery life, it is essential to allow the batteries to fully discharge and enter a deep discharge state, before applying a new charge. In a conventional electric battery system, this requires driving the vehicle until the entire bank of batteries is discharged. This is rarely accomplished when the vehicle is utilized for short trips (e.g., daily back-and-forth to work). To be ready for the next day's trip to work, the batteries in a standard vehicle are charged overnight for the next day of operation.

In the present inventive system, the first bank of batteries 21 is always charged, while its companion, the second battery bank 22 is being discharged to drive motors 18 or other electric devices, not shown. In this manner, an operator can drive a short distance of about 100 miles or less, using only battery bank 21. Should the first bank of batteries 21 be fully discharged after its daily run or its daily power production cycle, it can be charged overnight. In the event that this first bank of batteries is not fully discharged at the end of the day, it can be used on the following day's run until it fully discharges. In the event that the first bank 21 is depleted on the second or third day, the second battery bank 22 is switched into the system. At the end of the day, the fully discharged first battery bank 21 is recharged, while the second battery bank 22 is ready for the next day's run. In this manner, each bank of batteries 21, 22 is always fully discharged before being recharged, thus extending and maximizing their operative life.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A power system for an electric vehicle or mobile power plant, comprising a first and second bank of batteries, said first bank powering said electric vehicle, while said second bank remains at the ready to power said electric vehicle when said first bank becomes fully discharged, and vice versa, each respective bank being rechargeable when fully discharged, thus extending and maximizing the operative life of each of said first and second bank of batteries, and wherein one bank of said first and second bank of batteries is always substantially fully charged and at the ready to power said electric vehicle when the other bank of batteries becomes fully discharged.

2. The power system in accordance with claim 1, further comprising a transient recharging system including a pair of first and second generators, each respectively connected to said first and second bank of batteries, said pair of first and second generators operatively connected to a drive wheel of said electric vehicle for supplying a transient recharge to said respective pair of first and second generators.

3. The power system in accordance with claim 2, wherein said pair of first and second generators are connected to a timing or V-belt, that is engaged with a V-belt pulley operatively connected to said drive wheel of said electric vehicle.

4. A method for powering an electric vehicle or mobile power plant, wherein a first and second bank of batteries, respectively, are used to power said electric vehicle, said method comprising the steps of:

a) using said first bank of batteries to power said electric vehicle, while said second bank of batteries stands at the ready with a substantially full charge;

b) allowing said first bank of batteries to substantially completely discharge, before applying a substantially full recharge;

c) using said second bank of batteries with said substantially full charge to power the vehicle, after said first bank of batteries has become substantially discharged; and d) allowing said second bank of batteries to substantially completely discharge, before applying a substantially full recharge.

5. The method in accordance with claim 4, further comprising the step of:

e) transient recharging each bank of batteries during vehicle operation.

6. A mobile power plant battery recharging system comprising:

a) at least two battery banks mounted on a mobile chassis with at least one of said at least two battery banks being substantially fully charged and at the ready to provide power;

b) at least two generators, each of said generators being electrically connected to a respective one of said at least two battery banks to provide transient charging to its respective battery bank and keep it substantially fully charged and at the ready; and c) means for charging each of said at least two battery banks via said respective generators, seriatim, when each of said at least two battery banks is substantially discharged.

7. The mobile power plant battery recharging system in accordance with claim 6, further comprising:

d) monitoring means for determining when one of said battery banks is substantially depleted.

8. The mobile power plant battery recharging system in accordance with claim 7, further comprising:

e) control means operatively connected to said monitoring means and to said at least two generators for selecting which of said at least two battery banks is to be charged.

\* \* \* \* \*